S. A. MOSS.
MEANS FOR BALANCING RECIPROCATING APPARATUS.
APPLICATION FILED MAY 13, 1918.
1,330,602.
Patented Feb. 10, 1920.
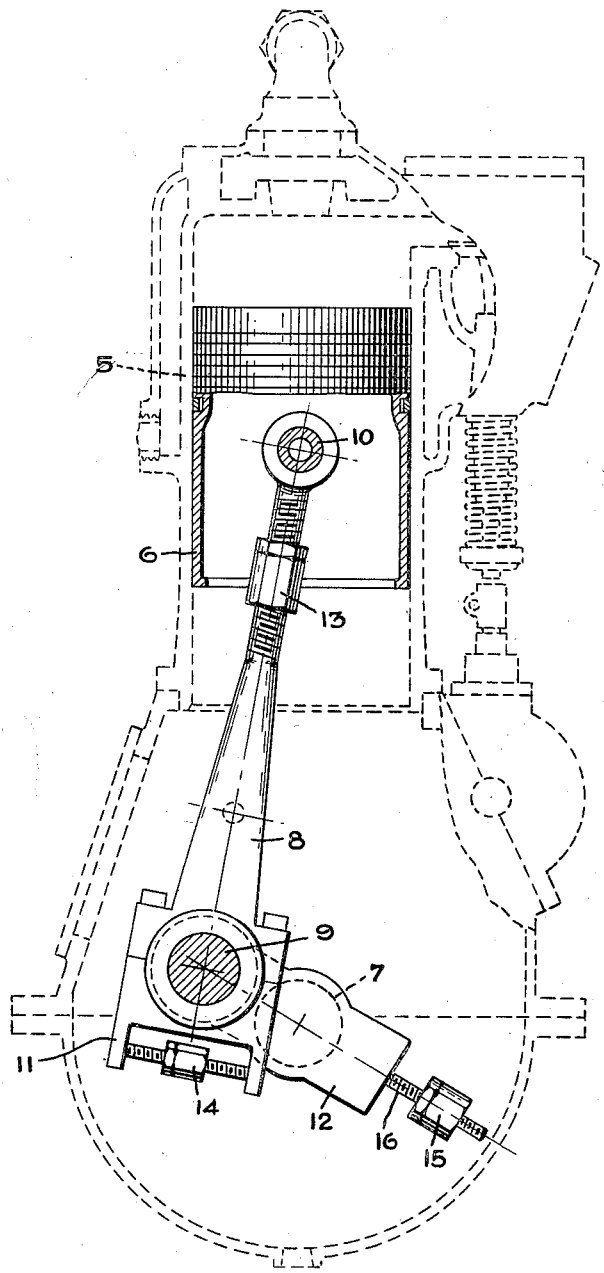
Inventor,
Sanford A. Moss,
by Albert G. Davis
His Attorney.

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

MEANS FOR BALANCING RECIPROCATING APPARATUS.

1,330,602.  Specification of Letters Patent.  Patented Feb. 10, 1920.

Application filed May 13, 1918. Serial No. 234,269.

*To all whom it may concern:*

Be it known that I, SANFORD A. MOSS, a citizen of the United States, residing at Lynn, in the county of Essex, State of Massachusetts, have invented certain new and useful Improvements in Means for Balancing Reciprocating Apparatus, of which the following is a specification.

The present invention relates to reciprocating apparatus such as steam or internal combustion engines wherein a reciprocating member is connected to a crank shaft by a connecting rod and has for its object to provide an improved arrangement for balancing the moving parts of such apparatus.

For a consideration of what I believe to be novel and my invention, attention is directed to the accompanying description and the claims appended thereto.

In the following specification the invention is illustrated and specifically described as applied to a reciprocating engine as this is an apparatus to which my invention is particularly applicable but it will be understood that it may be applied to any apparatus having similar moving parts. It will also be understood that the invention may be applied to either a single cylinder or a multi-cylinder engine.

A reciprocating engine has certain parts which move backward and forward and certain parts around the crank pin which rotate, such parts being connected together by a connecting rod, the one end of the connecting rod being connected to the reciprocating parts by what is usually termed a wrist pin. A connecting rod can be considered as divided into two parts, one of which is equivalent to a rotating part and can be added to the parts around the crank pin and the other of which is equivalent to a reciprocating part and can be added to the other reciprocating parts. Now the rotating parts in the vicinity of the crank pin can, of course, be exactly counter-balanced by a weight placed opposite the crank pin and this, as is well known, is usually done. There is, however, a shaking force which is set up due to the inertia of the reciprocating parts and this force, so far as I am aware, has never been wholly eliminated although it can be partially eliminated by providing counterweight in addition to that required for balancing the rotating parts.

I have devised an arrangement whereby I am enabled to wholly eliminate this shaking force due to the reciprocating parts as referred to above and am therefore able to completely balance a reciprocating engine.

According to my invention, I place a weight on the connecting rod beyond the crank pin of such size as to make the radius of gyration of the rod (including the reciprocating parts which may be considered a part of the wrist pin end and wholly concentrated at the wrist pin) about a perpendicular axis through the wrist pin, equal to the length of rod between the wrist pin and crank pin centers. As is well known, the radius of gyration of a solid body about an axle is the square root of the average of the values of the squares of the distances to each of the equal elementary particles of which the body consists. I have found that when the connecting rod radius of gyration is thus made equal to its length, that portion of the rod which acts as a reciprocating part is zero, and the rod (including of course, the parts added at the wrist pin end) acts wholly as a rotating part. Such a rotating part can be completely balanced by a counterweight of equal moment placed opposite the crank pin.

In the drawing, the figure is a diagrammatic view of a single cylinder reciprocating engine embodying my invention.

Referring to the drawing, 5 indicates a cylinder, 6 a piston, 7 a crank shaft and 8 a connecting rod which connects the piston to a crank pin 9 on the crank shaft. This connecting rod is connected to piston 6 by a wrist pin 10. Now according to my invention I provide a counterweight 11 on the end of the connecting rod which, as already stated, is of such size as to make the radius of gyration of the rod 8 about a perpendicular axis through the wrist pin 10 equal to the length of rod between the wrist pin and crank pin centers. This results in the rod acting wholly as a rotating part and I then provide a counterweight 12 opposite the crank pin which balances such rotating part. The correct value for counterweights 11 and 12 can be determined approximately by suitable calculations. The exact values cannot be readily found because such minor effects as friction, mathematical forces of small magnitude, etc., may cause the correct values for any given engine to vary slightly from the calculated values. Furthermore, it is difficult to make absolutely exact computations in such a matter. I accordingly design the connecting rod and counterweights as nearly correct as convenient and provide adjustable weights by means of which an exact balance can be obtained by trial. For this purpose I preferably provide an adjustable weight 13 on the connecting rod here shown in the form of a nut by means of which the center of gravity of the connecting rod can be moved slightly longitudinally of the connecting rod, a second weight 14 adjustable cross wise of the connecting rod for shifting the center of gravity crosswise, and a third weight 15 which forms in substance a part of counterweight 12 and may be adjusted along threaded rod 16 to change the amount of counter balance. By suitably adjusting these weights the desired balance can always be obtained.

While I prefer to utilize such an adjustment and counterweighting of the moving parts as to make the radius of gyration of the connecting rod about the wrist pin equal to the length of the connecting rod, as this results in a most perfect balance of the moving parts, it will be understood, of course, that I am not necessarily limited to such exact equality as an approximate equality will result in at least a partial neutralization of the unbalanced forces and substantial improvement in operation. Ordinarily the center of gravity of a connecting rod itself is at about $\frac{9}{16}$ of the rod length from the wrist pin. If now, the reciprocating parts be added at the wrist pin end, the center of gravity of the combined system will ordinarily be closer to the wrist pin than to the crank pin. The use of my additional counterweight 11 results in moving the center of gravity of the combined system so that it will be nearer to the crank pin than to the wrist pin, and I have found that whenever the connecting rod is provided with a counterweight to produce this result, without however, bringing the center of gravity entirely to the crank pin that I obtain a greater or lesser neutralization of the unbalanced forces.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a mechanism, the combination of a reciprocating member, a crank shaft, and a rod connecting them, said rod being so constructed and arranged that the radius of gyration of said rod and reciprocating member about the axis of the connection of the rod with the reciprocating member is approximately equal to the distance between the centers of such connection and the connection with the crank shaft.

2. In an apparatus of the character described, the combination of a reciprocating member, a crank shaft, a rod connecting them, said rod being so constructed and arranged that the radius of gyration of said rod and reciprocating member about the axis of the connection of the rod with the reciprocating member is approximately equal to the distance between the centers of such connection and the connection with the crank shaft, and adjustable means on the connecting rod for adjusting the position of its center of gravity.

3. In an apparatus of the character described, the combination of a reciprocating member, a crank shaft, a rod connecting them, said rod being so constructed and arranged that the radius of gyration of said rod and reciprocating member about the axis of the connection of the rod with the reciprocating member is approximately equal to the distance between the centers of such connection, and the connection with the crank shaft, and a counterweight on the crank shaft for balancing the rotating parts.

4. In an engine, the combination of a cylinder, a piston, a shaft having a crank, a connecting rod having one end connected to the crank, a wrist pin connecting the other end of the rod to the piston, and a counterweight on the crank shaft end of the connecting rod which serves to make the radius of gyration of the rod and piston about the wrist pin axis approximately equal to the distance between the centers of the crank pin and wrist pin.

5. In an engine, the combination of a cylinder, a piston, a shaft having a crank, a connecting rod having one end connected to the crank, a wrist pin connecting the other end of the rod to the piston, a counterweight on the crank shaft end of the connecting rod which serves to make the radius of gyration of the rod and piston about the wrist pin axis approximately equal to the distance between the centers of the crank pin and wrist pin, and a counterweight on the crank shaft for balancing the rotating parts.

In witness whereof, I have hereunto set my hand this 8th day of May, 1918.

SANFORD A. MOSS.